C. D. WOOD.
VARIABLE SPEED GEARING.
APPLICATION FILED FEB. 14, 1918.
1,322,388.
Patented Nov. 18, 1919.
2 SHEETS—SHEET 1.
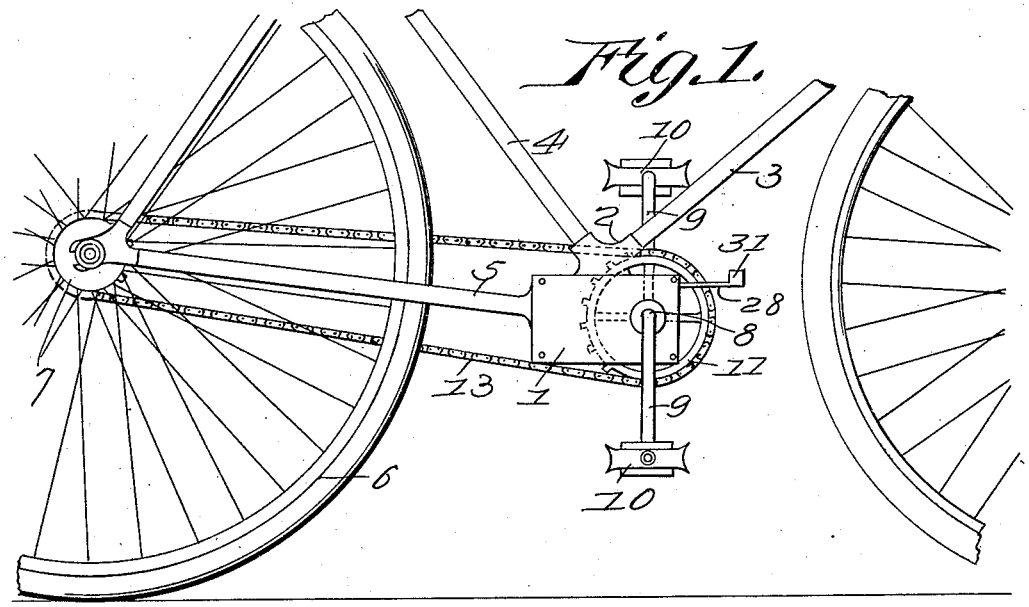
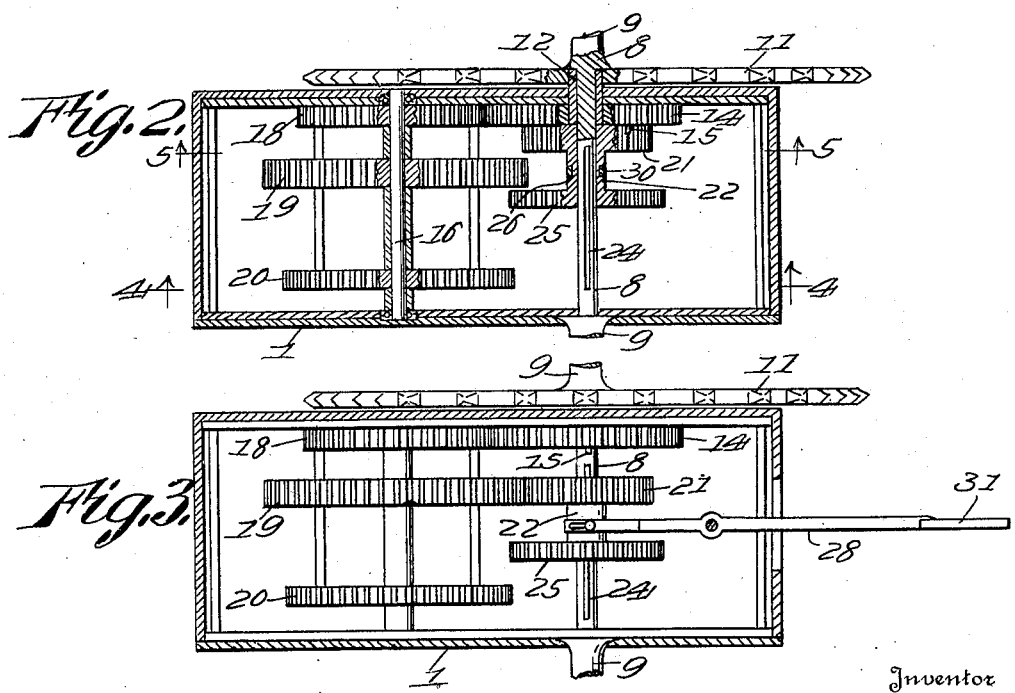
Inventor
C. D. Wood,
By Talbert & Parker
Attorneys

C. D. WOOD.
VARIABLE SPEED GEARING.
APPLICATION FILED FEB. 14, 1918.

1,322,388.

Patented Nov. 18, 1919.
2 SHEETS—SHEET 2.

Inventor
C. D. Wood,
By Talbert & Parker
Attorneys

UNITED STATES PATENT OFFICE.

CLARENCE D. WOOD, OF ASHLAND, OREGON.

VARIABLE-SPEED GEARING.

1,322,388.  Specification of Letters Patent.  Patented Nov. 18, 1919.

Application filed February 14, 1918. Serial No. 217,239.

*To all whom it may concern:*

Be it known that I, CLARENCE D. WOOD, a citizen of the United States, residing at Ashland, in the county of Jackson and State of Oregon, have invented certain useful Improvements in Variable-Speed Gearing, of which the following is a specification, reference being had therein to the accompanying drawing.

The object of the invention is to provide a novel variable speed transmission mechanism particularly adapted for bicycles and the like. To this end the invention comprises a casing designed for suspension from the frame of the bicycle. In the opposite side walls of this casing the crank shaft to which the pedals are connected is journaled. This crank shaft exterior to the casing supports a loosely mounted sprocket wheel over which the drive chain from the rear wheel is trained. Interior to the casing there are carried a plurality of gear couples the units of which are designed to be operatively connected with each other by means protruding from the casing and engageable by either the hand or foot so that the necessary operative connections between the units of the gear couples may be effected.

In illustrating the invention, a specific embodiment is adhered to but to this embodiment the invention is not to be restricted. The right is reserved to make any changes or alterations suggested by the demands of practice, in so far as such changes or alterations are compatible in spirit with the annexed claim.

In the accompanying drawings:

Figure 1 is a side elevational view of a portion of a bicycle with the driving means therefor constructed in accordance with the invention.

Fig. 2 is a horizontal sectional view through the casing of the variable speed gear, this figure showing the gearing connected so as to secure the highest speed obtainable.

Fig. 3 is a horizontal sectional view similar to Fig. 2 but in this figure the gearing is operatively connected so as to obtain the lowest speed.

Figure 4:
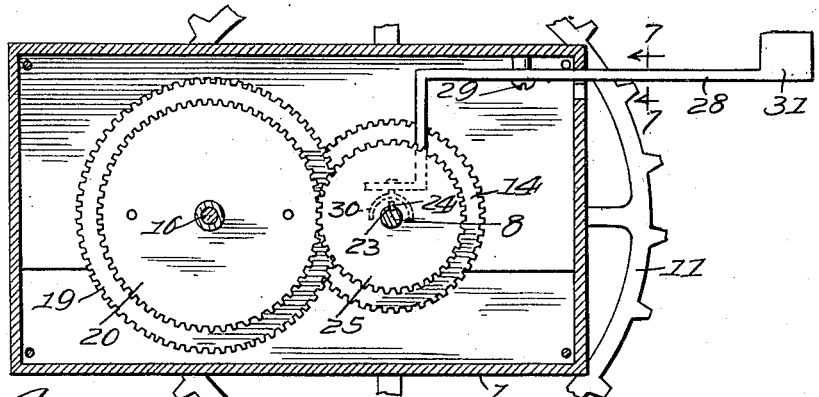
Fig. 4 is a section on the line 4—4 of Fig. 2.

As shown, the invention comprises a casing 1 of rectangular shape, upstanding from the top of which there is a substantially V-shaped coupling 2, one of whose legs connects with the front bar 3 of the bicycle frame shown and the other of whose legs connects with the rear bar 4 of said frame. The lower rear fork 5 of the bicycle frame extends from the rear of the casing and has rotatably mounted between its arms the rear wheel 6 carrying the usual sprocket wheel 7 positively connected therewith for the purpose of turning the rear wheel when a turning movement is imparted to the said sprocket, as it is in the operation of the bicycle. A crank shaft or main shaft 8 is carried by the casing 1 and this shaft is transversely disposed with reference to the casing, being rotatably mounted in the opposite side walls thereof, the cranks 9 being of course exterior to the casing and disposed 180° from each other, as is usual, carrying the pedals at their outer extremities.

A sprocket wheel 11 is mounted close to the casing on that side of the bicycle frame on which the sprocket 7 is carried. This sprocket wheel 11, while concentric with the main shaft 8, moves independently of the latter, being carried on the outer extremity of the sleeve 12. The sleeve 12 is rotatably mounted in that wall of the casing 1 adjacent the sprocket wheel 11 and projects into the casing, being in surrounding relation to the shaft 8 and being capable of angular movement both with respect to the shaft and with respect to the casing. Rotary motion of the sprocket wheel 11 is had through the medium of this sleeve 12 and this motion is transmitted to the sprocket wheel 11 and rear wheel 6 of the bicycle through a chain 13 which is trained over both sprockets in the usual way.

Interior to the casing 1, the sleeve 12 carries a gear 14 which is positively connected to the sleeve and stands adjacent the inner wall of the casing 1. Pins 15 are mounted in and project laterally from that side of the gear 14 opposite the side standing adjacent to the casing. These pins are disposed on opposite sides of the center of the gear but at points intermediate between the center and the periphery and are for a purpose hereinafter appearing.

Figure 5:
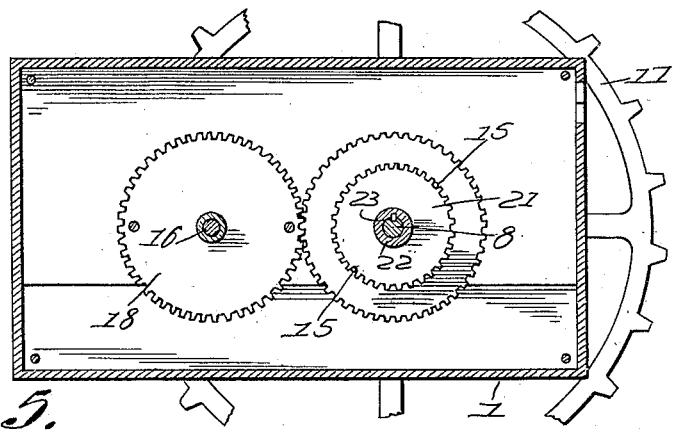
Fig. 5 is a section on the line 5—5 of Fig. 2.
Figure 6:
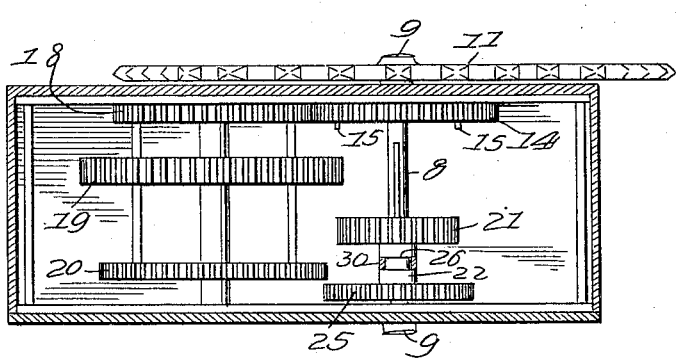
Fig. 6 is a horizontal sectional view similar to Figs. 2 and 3 but showing the various gear units so disposed that there is no driving connection between the crank shaft of the bicycle and the sprocket wheel.
Figure 7:
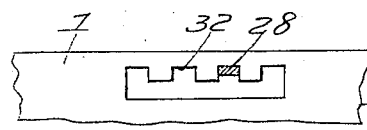
Fig. 7 is a section on the line 7—7 of Fig. 4.

To the rear of the main shaft 8 but also mounted in the casing 1 there is a secondary or supplemental shaft 16. This shaft is a stationary shaft and is supported in the casing by having its opposite ends secured in the opposite side walls of the casing. Rotatably mounted upon this shaft 16 and adjacent that side wall close to which the gear 14 stands, there is a gear 18 which meshes with the gear 14. In addition to this gear 18, the shaft 16 also carries the gears 19 and 20, the former being of greater diameter than the latter and being spaced from the latter on the shaft, as well as being spaced from the gear 18. This spacing of the gears 18, 19 and 20 is effectively provided for by the mounting of sleeve members between the adjacent gears and a sleeve member between the gear 20 and that side wall of the casing 1 remote from the gear 18. The gears 18, 19 and 20 are designed to move as a unit and to this end are positively connected together by means of axially disposed rods which pass through the center gear 19 and connect with the gears 18 and 20. This construction is clearly illustrated in Figs. 2 to 6 of the drawings.

Designed for operative engagement with the gear 19 there is a gear 21, this gear being formed integral with a sleeve or thimble 22 which is carried by the main shaft 8. This sleeve is mounted for longitudinal movement along the shaft but is precluded from angular movement thereon, a key-way 23 cut in the bore of the sleeve and a spline 24 carried by the shaft 8 making for the accomplishment of this purpose. The sleeve 22 at the end remote from the gear 21 carries the gear 25 which is also integral with the sleeve and which is designed for operative engagement with the gear 20. The spacing between the gears 25 and 21 is less than that between the gears 19 and 20. Hence when the gear 21 meshes with the gear 19, the gear 25 is not in a position where it may mesh with its mating gear 20. Conversely, when the gear 25 meshes with the gear 20, no operative engagement between the gears 21 and 19 is possible.

Since the sleeve 22 is mounted for longitudinal movement on the shaft 8, an operative connection between the gears 21 and 19 or between the gears 25 and 20 may be had but the two operative connections may not be had at the same time. If the gears 21 and 19 are thrown into mesh, as shown in Fig. 3, and rotary motion is imparted to the main shaft 8 by means of the pedals 10 and their attendant cranks, the gear 21 will be given the same angular velocity as the shaft 8. This gear will then turn the gear 19 which being of greater diameter than the gear 21 will turn at a reduced angular velocity to the gear 18 through the medium of the rods connecting the two gears. This gear 18 will then transmit its motion to the gear 14 but since the angular velocity of the gear 18 is less than that of the gear 21, the gear 14 will be turned at an angular speed less than the angular speed of the gear 21. But the gear 14 is positively connected to the sprocket wheel 11, the two being mounted on the sleeve 12. Hence the sprocket wheel 11 will turn at a less angular velocity than the velocity of the shaft 8 and the rear wheel 6 will turn at much less speed than would be the case were the sprocket wheel 11 mounted directly on the shaft.

If the sleeve 22 be moved so as to bring into mesh the gears 25 and 20, the sprocket wheel will still move at a less angular velocity than the shaft 8 but its speed when this connection is made will be greater than when the gears 21 and 19 are operatively connected because of the increased gear ratio obtained by the meshing of the gears 25 and 20. The sleeve 22 may be moved toward the gear 14, in which case the gear 21 will be brought against the side of the gear 14, when the pins 15 will engage between diametrically opposite pairs of teeth on the gear 21, the distance between the pins being substantially equal to the pitched diameter of the gear 21. When this connection is effected, the angular movement of the shaft 8 is tranferred directly to the gear 14 and from it to the sprocket wheel 11, when the highest angular velocity of the sprocket 11 is obtained, thus providing for the driving of the wheel 6 at its greatest speed.

If the sleeve 22 be moved along the shaft 8 toward that side of the casing opposite the gear 14, the shaft 8 may be thrown entirely out of operative connection with the sprocket wheel by moving the sleeve 22 until the gear 25 stands adjacent the said opposite side of the casing 1. None of the gears will then be in mesh with their mates except the gears 14 and 18, but since gear 14 is normally movable with respect to the shaft and since the gear 18 cannot be turned except through the instrumentality of the gears 19 and 20, the sprocket wheel 11 will remain at rest irrespective of whether the shaft 8 is turned or not.

To provide for the ready shifting of the sleeve 22 along the shaft 8 to effect the connections above referred to, the sleeve is provided with a circumferential groove 26, a ring 30 being carried by the sleeve and lying in this groove. The ring 30 is provided with diametrically opposite radially disposed pins with which the arms of the forked end of a lever 28 may engage, the arms straddling the ring and being provided with longitudinal slots in which the pins engage, as clearly illustrated in Fig. 3. The lever 28 is pivotally mounted on the inner face of the top wall of the casing 1 by means of a suitable attaching device 29 protrudes through the front of the casing through a transversely disposed slot formed in the front wall thereof. The upper edge of this slot is provided with a series of notches or recesses 32 in any one of which the lever 28 may be engaged, each notch being provided to positively position the lever 28 so that any one of the operative connections between the shaft 8 and the sprocket wheel 11 may be had, as stated hereinbefore. One of the notches 32 serves to hold the lever 28 in a position where the gear 25 is held close to that side wall of the casing 1 opposite the gear 14, when, as has hereinbefore been shown, the shaft 8 may be turned without imparting any angular movement to the sprocket 11.

The forward or projecting end of the lever 28 is formed with an upstanding lug portion 31 for engagement by either the foot or the hand for the obvious purpose of shifting the lever by either foot or hand to effect the desired connections between the gears within the casing 1 for the changing of the speed of the sprocket 11 to the shaft 8.

The invention having been described, what is claimed as new and useful is:

In a variable speed gearing mechanism, a casing, a main shaft rotatably mounted in opposite walls of the casing, a sleeve in surrounding relation to the shaft and extending into and out of the casing, a power transmitting element carried by the sleeve exterior to the casing, a gear carried by the sleeve interior to the casing, a sleeve member mounted on the shaft interior to the casing, the said sleeve member being longitudinally movable on the shaft but precluded from angular movement thereon, a pair of spaced gears carried by the sleeve member, a stationary shaft carried within the casing, a plurality of gears positively interconnected and rotatably mounted on said stationary shaft, one of the said plurality of gears being in mesh with the first said gear, means for shifting the sleeve member so that one or the other of the gears carried thereby may be thrown into mesh with one or the other of the remaining of the plurality of gears, and pins inserted in one side of the first said gear on opposite sides of the center thereof, the distance between the pins being substantially equal to the pitched diameter of one of the gears of said sleeve member to permit the said pins engaging between the teeth of diametrically opposite pairs of teeth of the said gear carried by the sleeve member, whereby the power transmitting device may be positively driven by the said shaft but at various angular velocities with respect to the angular velocity of the said main shaft.

In testimony whereof I affix my signature.

CLARENCE D. WOOD.